United States Patent
Hargis

(10) Patent No.: US 9,906,180 B2
(45) Date of Patent: Feb. 27, 2018

(54) INVERTER DRIVES HAVING A CONTROLLED POWER OUTPUT

(71) Applicant: NIDEC CONTROL TECHNIQUES LIMITED, Newtown (GB)

(72) Inventor: Colin Hargis, Oswestry (GB)

(73) Assignee: NIDEC CONTROL TECHNIQUES LIMITED, Newtown (GB)

( * ) Notice: Subject to any disclaimer, the term of this patent is extended or adjusted under 35 U.S.C. 154(b) by 0 days.

(21) Appl. No.: 15/478,697

(22) Filed: Apr. 4, 2017

(65) Prior Publication Data

US 2017/0207740 A1  Jul. 20, 2017

Related U.S. Application Data

(63) Continuation of application No. 14/856,050, filed on Sep. 16, 2015, now Pat. No. 9,647,592.

(30) Foreign Application Priority Data

Sep. 17, 2014  (GB) .................................. 1416471.9

(51) Int. Cl.
  *H02P 23/14*  (2006.01)
  *H02P 27/06*  (2006.01)
  *H02P 23/04*  (2006.01)

(52) U.S. Cl.
  CPC .............. *H02P 23/14* (2013.01); *H02P 23/04* (2013.01); *H02P 27/06* (2013.01); *H02P 2205/03* (2013.01)

(58) Field of Classification Search
  CPC .......... H02P 23/14; H02P 23/04; H02P 27/06; H02P 2205/03

USPC .......................................................... 318/503
See application file for complete search history.

(56) References Cited

U.S. PATENT DOCUMENTS

| | | | | |
|---|---|---|---|---|
| 3,916,609 A | | 11/1975 | Yamada et al. | |
| 3,919,609 A | * | 11/1975 | Klautschek | H02P 23/0004 318/803 |
| 3,967,173 A | * | 6/1976 | Stich | H02P 27/08 318/811 |
| 4,066,938 A | * | 1/1978 | Turnbull | H02P 23/08 318/721 |
| 4,270,078 A | | 5/1981 | Walker et al. | |
| 4,333,042 A | * | 6/1982 | Kawada | H02P 27/08 318/801 |

(Continued)

FOREIGN PATENT DOCUMENTS

| | | |
|---|---|---|
| DE | 102011052568 A1 | 2/2013 |
| JP | S63257497 A | 10/1988 |

(Continued)

*Primary Examiner* — Rita Leykin
(74) *Attorney, Agent, or Firm* — Harness, Dickey & Pierce, P.L.C.

(57) ABSTRACT

An electromechanical system includes an inverter drive, a component arranged during operation to generate a variable force having one or more periodic frequency components, and processing circuitry arranged to determine the power output of the inverter drive, measure a difference between the power output and a reference power output, and control an output frequency of the inverter drive as a function of the measured difference, so as to stabilise the power output during operation of the component. Other example electromechanical systems, inverter drives and methods are also disclosed.

16 Claims, 4 Drawing Sheets

(56) References Cited

U.S. PATENT DOCUMENTS

| | | | | |
|---|---|---|---|---|
| 4,524,310 A * | 6/1985 | Nagase | H02P 21/09 318/801 |
| 4,574,340 A * | 3/1986 | Baker | H02M 7/53875 363/41 |
| 4,581,696 A * | 4/1986 | Gyugyi | H02M 5/273 318/810 |
| 4,648,022 A * | 3/1987 | Schauder | H02M 5/273 363/159 |
| 4,652,989 A * | 3/1987 | Kurosawa | H02M 5/273 318/808 |
| 4,726,738 A * | 2/1988 | Nakamura | F04B 49/065 318/432 |
| 4,881,022 A * | 11/1989 | Boys | H02P 27/06 318/800 |
| 4,905,135 A | 2/1990 | Unehara et al. | |
| 4,971,522 A * | 11/1990 | Butlin | E21B 43/127 318/808 |
| 4,980,629 A * | 12/1990 | Bando | H02P 9/007 318/52 |
| 5,263,113 A * | 11/1993 | Naitoh | B21B 37/46 318/432 |
| 5,351,181 A * | 9/1994 | Brennen | H02J 3/1842 307/105 |
| 5,450,306 A * | 9/1995 | Garces | H02M 5/458 363/132 |
| 5,545,957 A * | 8/1996 | Kubo | H02P 23/16 318/400.13 |
| 5,686,807 A | 11/1997 | Kusano et al. | |
| 6,137,187 A * | 10/2000 | Mikhail | F03D 7/0224 290/44 |
| 6,166,929 A * | 12/2000 | Ma | H02M 5/4505 363/37 |
| 6,208,109 B1 * | 3/2001 | Yamai | H02P 6/10 318/430 |
| 6,316,895 B1 * | 11/2001 | Ramarathnam | H02M 7/53873 318/256 |
| 6,366,483 B1 * | 4/2002 | Ma | H02M 1/4216 363/37 |
| 6,420,795 B1 | 7/2002 | Mikhail et al. | |
| 6,600,240 B2 | 7/2003 | Mikhail et al. | |
| 6,847,128 B2 | 1/2005 | Mikhail et al. | |
| 6,856,039 B2 | 2/2005 | Mikhail et al. | |
| 6,982,533 B2 * | 1/2006 | Seibel | H02P 21/10 318/432 |
| 7,023,160 B2 | 4/2006 | Virtanen et al. | |
| 7,095,131 B2 | 8/2006 | Mikhail et al. | |
| 7,412,007 B1 * | 8/2008 | Richley | H04B 1/7174 375/296 |
| 7,525,270 B2 | 4/2009 | Washino et al. | |
| 8,044,632 B2 | 10/2011 | Obi et al. | |
| 8,076,896 B2 | 12/2011 | Yamamoto et al. | |
| 8,183,814 B2 | 5/2012 | Fuchs | |
| 8,436,569 B2 | 5/2013 | Fuchs | |
| 8,459,802 B2 | 6/2013 | Ono et al. | |
| 8,493,014 B2 | 7/2013 | Henderson et al. | |
| 8,618,756 B2 | 12/2013 | Hung et al. | |
| 8,704,393 B2 | 4/2014 | Perley et al. | |
| 8,754,602 B2 * | 6/2014 | Bonvin | G11B 19/20 318/400.23 |
| 8,823,191 B2 | 9/2014 | Andresen et al. | |
| 8,941,321 B2 | 1/2015 | Matsumoto | |
| 9,190,944 B2 | 11/2015 | Perley et al. | |
| 9,192,034 B2 * | 11/2015 | Nakamura | H05B 41/2882 |
| 9,337,764 B2 * | 5/2016 | Yamashita | B02C 18/24 |
| 9,647,592 B2 | 5/2017 | Hargis | |
| 2001/0007416 A1 | 7/2001 | Koide et al. | |
| 2011/0254488 A1 * | 10/2011 | Clothier | H02P 6/008 318/400.14 |
| 2011/0256005 A1 | 10/2011 | Takeoka et al. | |
| 2013/0119906 A1 | 5/2013 | Brattoli et al. | |
| 2014/0191703 A1 | 7/2014 | Yamashita et al. | |
| 2015/0357938 A1 | 12/2015 | Yamasaki et al. | |

FOREIGN PATENT DOCUMENTS

| | | |
|---|---|---|
| JP | 200565449 A | 3/2005 |
| JP | 2008109826 A | 5/2008 |

* cited by examiner

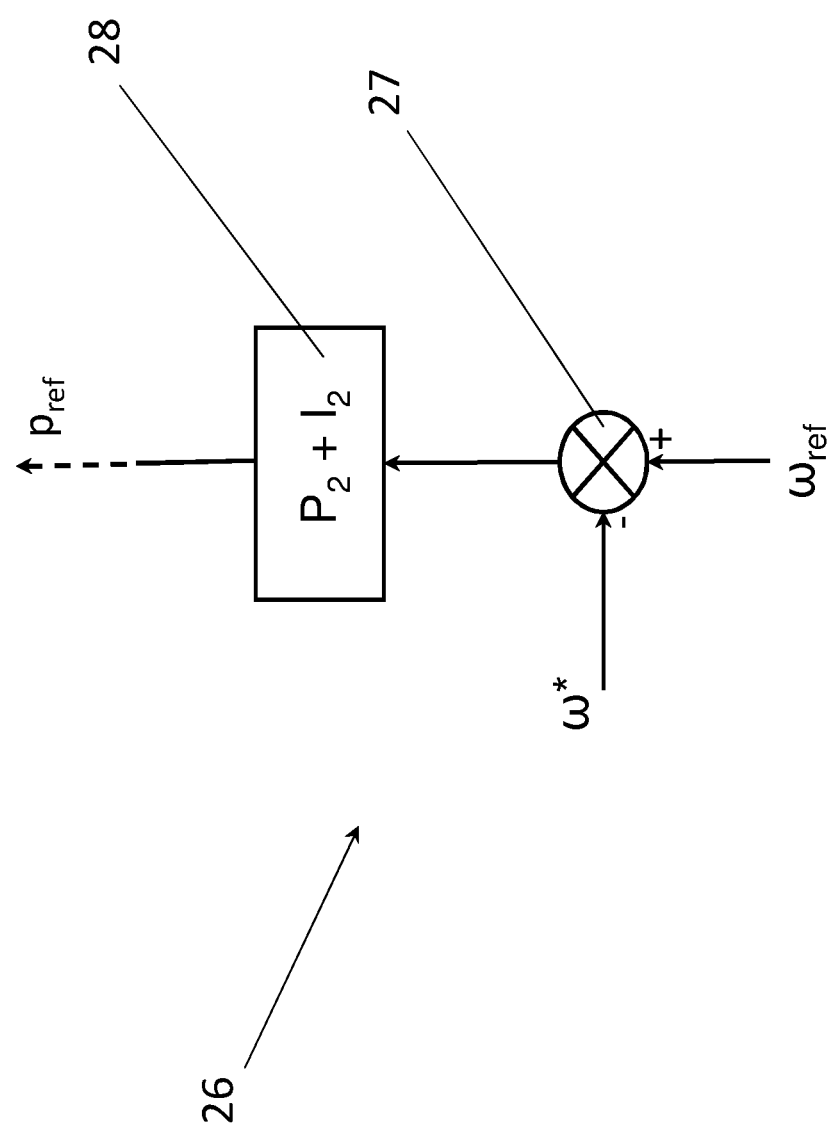

INVERTER DRIVES HAVING A CONTROLLED POWER OUTPUT

CROSS-REFERENCE TO RELATED APPLICATIONS

This application is a continuation of U.S. patent application Ser. No. 14/856,050 filed Sep. 16, 2015, which claims the benefit and priority of Great Britain Patent Application No. 1416471.9 filed Sep. 17, 2014. The entire disclosures of the above applications are incorporated herein by reference.

FIELD

The present disclosure relates to an inverter drive having a controlled power output.

BACKGROUND

This section provides background information related to the present disclosure which is not necessarily prior art.

Inverter drives, also known as variable frequency/speed drives or simply drives, are electronic devices designed to provide a controllable AC current to a motor driving a load, so as to vary the motor speed.

In cases where the torque of the load pulsates, for example if the load is a reciprocating pump or compressor, the fluctuations in the torque are transmitted back to the inverter drive, assuming the motor is operated at a constant speed. These fluctuations manifest themselves as corresponding fluctuations in the electrical power input and supply voltage of the inverter drive. This may cause irritating flicker of electrical lighting in the vicinity of the inverter drive.

There exists a range of flicker frequencies, between about 100 and 1,500 cycles per minute, to which the eye is particularly sensitive. In such cases, the restrictions placed on equipment capable of generating such flicker frequencies can be quite severe, and it can be difficult to deploy certain designs of machine which tend to cause torque fluctuations in this range. For example, there are technical standards such as IEC 61000-3-3 and IEC 61000-3-11 that place limits on the fluctuation of the current drawn by electrical equipment. If any equipment exceeds these limits then it may not be possible to place the equipment on certain markets. Therefore, when using an inverter drive operating on a pulsating load, it is often desirable to eliminate lighting flicker whenever possible.

The problem of lighting flicker can be reduced by a variety of well-known techniques such as through use of a mechanical flywheel, or through multiple cylinders in the case of a reciprocating pump. However, these methods all bear associated costs and it would be advantageous if such costs could be minimised or eliminated entirely.

The present disclosure seeks to provide an improved method of addressing the problem of lighting flicker, as encountered when an inverter drive operates on a pulsating load.

SUMMARY

This section provides a general summary of the disclosure, and is not a comprehensive disclosure of its full scope or all of its features.

In a first aspect of the disclosure, there is provided an electromechanical system. The system comprises: an inverter drive; a component arranged during operation to generate a variable force having one or more periodic frequency components; and processing circuitry. The processing circuitry is arranged to: determine the power output of the inverter drive; determine a difference between the power output and a reference power output; and control an output frequency of the inverter drive as a function of the difference, so as to stabilise the power output during operation of the component.

In a second aspect of the disclosure, there is provided an inverter drive comprising processing circuitry. The processing circuitry is arranged, when the inverter drive is operably connected via an electrical machine to a component arranged during operation to generate a variable force having one or more periodic frequency components, to: determine the power output of the inverter drive; determine a difference between the power output and a reference power output; and control an output frequency of the inverter drive as a function of the difference, so as to stabilise the power output during operation of the component.

In a third aspect of the disclosure, there is provided a method of controlling a power output of an inverter drive operably connected via an electrical machine to a component. The component is arranged during operation to generate a variable force having one or more periodic frequency components. The method comprises determining the power output of the inverter drive, determining a difference between the power output and a reference power output, and controlling an output frequency of the inverter drive as a function of the difference, so as to stabilise, or smooth, the power output during operation of the component.

By varying the output frequency of the inverter drive in this fashion during a period or cycle of the force of the component, power flow between the component and the inverter drive may be regulated, and kept at a relatively constant level. The output frequency may be controlled by varying or controlling a reference frequency or other reference input (e.g. a reference speed) of the inverter drive. The reference frequency may be any set frequency at which the inverter is run or operated. When the inverter drive is connected to the mains power supply, this may reduce lighting flicker or other undesirable effects of pulsating or rapidly varying electrical power demand. The disclosure therefore reduces or removes the need for mechanical flywheels and the like, as the method may simply be implemented within software operating on the drive.

By varying the speed of the shaft (e.g. of the electrical machine) in an intelligent fashion, rather than holding it as constant as possible which is the conventional approach, the pulsation of power is reduced. Compliance with flicker requirements is therefore facilitated, and, in the case where a variable speed drive is required, for example for energy efficiency reasons, the additional cost is minimal. The disclosure furthermore allows reciprocating machines to be used with fewer cylinders (reducing the cost and improving the efficiency) or with reduced flywheel inertia, or both.

The variable force has at least one periodic frequency component such that a periodic or regularly repeating or oscillating variation in the force is generated or produced. In the case of a rotating component or machine, the force is a torque. The component may be a load that produces a pulsating torque. For example, the method may be embodied in a system including an inverter drive operably connected to an electric motor driving a rotary pump, compressor, or similar device or component in which a pulsation or fluctuating torque may be generated.

Throughout the disclosure, speed is largely analogous to frequency, in that the frequency of the inverter drive translates into a rotational or cyclic speed of a moving part of the component. A variety of control arrangements may be used within the inverter drive to link the output frequency to an input reference speed or frequency demand, directly or indirectly, using well-known processes or algorithms which aim to optimise aspects of the drive performance. Any of these arrangements may be used with the disclosure. The description refers primarily to a reference frequency, but equally a reference speed or other related reference input may be controlled whose effect is primarily to control the output frequency so as to control the motor speed.

The electrical machine may be an electric motor, and the output power may be delivered by the inverter drive through the electrical machine to the component so as to cause the component to generate the variable force. The most common form of motor is rotary, whereby the mechanical output is a shaft which delivers mechanical power in the form of torque and angular speed. However, the disclosure may also apply to linear motors where the mechanical output is a linearly moving part which delivers mechanical power in the form of force and speed. For clarity, the following disclosure refers to torque and angular speed in the context of a rotary motor, but it should be understood that the inventive concept may be analogously applied when discussing force and speed in the context of a linear motor.

The stabilised or balanced power output may be substantially constant over one period of the variable force. One period of the variable force may be one period of any of the periodic frequency components of the variable force. Thus, by varying or controlling the output frequency delivered by the inverter drive, in the manner described above, fluctuations in the power output may be minimised, which may correspondingly help reduce lighting flicker.

Determining the power output may comprise estimating or deriving the power output, as described below.

An average output frequency of the inverter drive may be substantially constant over one period of the variable force. Thus, whilst the output frequency or speed of the inverter drive may vary during a period or cycle of the force generated by the component, the average speed or frequency of the inverter drive during this cycle may be substantially constant.

Controlling the output frequency of the inverter drive may comprise controlling the output frequency substantially over one period of the variable force.

A frequency of the one or more periodic frequency components may be between about 1.6 Hz and 25 Hz. At these frequencies the eye may be sensitive to flickering in electrical lighting and therefore the power output of the inverter drive may be controlled so as to advantageously reduce the effect of the flickering.

The reference power output may be determined by: determining an output frequency of the inverter drive; determining a difference between the output frequency and a reference output frequency; and controlling the reference power output as a function of the difference between the output frequency and the reference output frequency.

Typically, the mindset in the industry is to maintain the speed of the drive constant at a desired value, depending on the load being driven. However, the disclosure may advantageously allow the average long-term speed of the drive to be maintained at a desired value by controlling the reference power output, whilst simultaneously allowing the instantaneous, dynamic speed of the drive to vary within each cycle of the component (e.g. during each period of the force). Thus, the speed of the inverter drive may be varied dynamically within each shaft revolution (e.g. in the context of a rotary machine) in order to keep the drive input power constant to avoid lighting flicker.

Determining the power output of the inverter drive may comprise determining an output voltage and an output current of the inverter drive. Alternatively or in addition, determining the power output of the inverter drive may comprise determining an output frequency/speed and an output torque of the electrical machine. These values may be calculated, derived or estimated from data within the inverter drive.

There exist various AC motor inverter control systems that may be used to provide inverter speed and torque estimates. This could include, for speed: a simple frequency value, for open-loop control; a frequency compensated for estimated slip; an explicit speed estimate for a sensorless vector; or an actual speed measurement for a full vector controller. For torque, this could include: the active component of inverter output current; or a torque estimate as exists in a vector controller. Of course, other methods of estimating the speed/frequency and torque may be implemented, as would be known to a person skilled in the art.

Stabilising the power output may result in stabilising an input current of the inverter drive. Stabilisation generally means that fluctuations in the load torque (or force) are not copied to the input current, as this can lead to lighting flicker. Rather, any such fluctuations are eliminated or reduced by varying or controlling the output frequency of the inverter drive to counteract such fluctuations, as explained above.

The variable force generated by the component during operation may be expressed as $q=Q_{av}+Q_{cyc}\sin(\omega_{cyc}t)$, where: q is a magnitude of the force; $Q_{av}$, $Q_{cyc}$ and $\omega_{cyc}$ are constants; and t is time. $Q_{av}$ may be an offset force, $Q_{puls}$ may be the maximum force per cycle or period of the force, and $\omega_{puls}$ may be the motor shaft speed or frequency.

An input current of the inverter drive may be connected to a mains power supply. If so, then with the present disclosure any fluctuations in the load power may be reduced or eliminated and thereby fluctuations in torque may be prevented from being copied or otherwise transmitted to the mains supply.

The disclosure may be furthermore embodied as software (for example within the inverter drive itself) which, when executed by a computer, cause the steps of any of the above-described methods to be carried out. The disclosure may therefore take the form of a control technique which may be implemented as an algorithm in a programmable controller or in a programmable variable speed drive, or by an analogue control system such as an electronic circuit.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Detailed embodiments of the disclosure will now be described in connection with the accompanying drawings, of which:

FIG. 2B is a schematic diagram of an average speed controller in accordance with an embodiment of the disclosure.

DETAILED DESCRIPTION

Example embodiments will now be described more fully with reference to the accompanying drawings.

The present disclosure seeks to provide an improved method of controlling a power output of an inverter drive. Whilst various embodiments of the disclosure are described below, the disclosure is not limited to these embodiments, and variations of these embodiments may well fall within the scope of the disclosure which is to be limited only by the appended claims.

Figure 1:
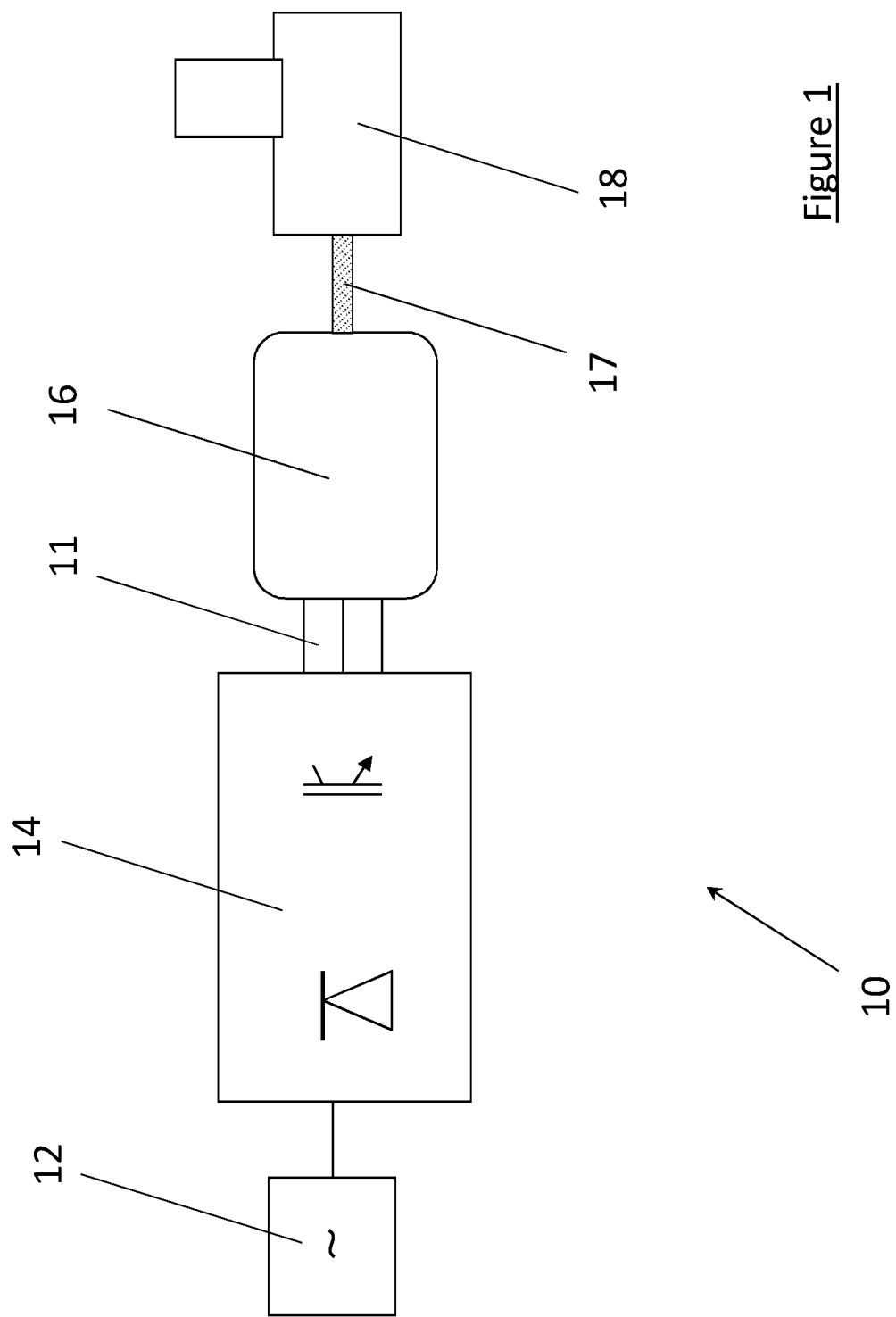
FIG. 1 is schematic diagram of an inverter drive operating a load.

To properly place the disclosure in context, in what follows is a brief description of a typical inverter drive system as used in the prior art. FIG. 1 illustrates such an inverter drive system for a rotating machine such as a pump or compressor. Inverter drive system 10 includes inverter drive 14 driven by frequency AC power supply 12. Inverter drive 14 provides an adjustable voltage and AC supply 11 to motor 16 in order to control the speed (e.g. rotational frequency) of motor shaft 17. Motor 16 is connected to load 18, such as a pump, via motor shaft 17. Load 18 may include a gearbox (not shown) in the mechanical part of load 18 to reduce the shaft speed to suit load 18.

Electric motors are most cost-effective with shaft speeds in the range of 1,500 or more revolutions per minute, where cyclical shaft torque pulsations are at frequencies beyond the flicker-sensitive region of the human eye. It is when the cyclic load shaft frequency is lower than this range that there is tendency for the torque to vary within a shaft revolution, and is likely to result in unacceptable flicker.

Typically, such a system is conventionally designed such that inverter drive 14 seeks to maintain a constant but controllable speed of motor shaft 17, to suit the demand of load 18. Most commonly, this is achieved by controlling the frequency of AC current supply 11 from inverter drive 14 to motor 16, which may be synchronous or asynchronous, but in any case whose speed is closely related to the frequency of the supply from inverter drive 14. Closed-loop speed control may be applied although it is not usually considered necessary.

If the motor shaft speed is constant, then the mechanical power delivered to load 18 is proportional to the torque, and assuming there is no significant storage of energy in system 10 then the electrical input power tracks the mechanical power closely, with the addition of a small amount of loss in the components of system 10. Therefore, any torque fluctuation is copied substantially faithfully to the mains input current, resulting in a fluctuation of the mains input current. As discussed above, this can result in undesirable lighting flicker.

In order to address this problem, the present disclosure allows the motor shaft speed to vary, in order to make the flow of power from inverter drive 14 to load 18 predominantly constant. Since at the input of inverter drive 14 the power is given by the product of the fixed supply voltage and the active component of the input current, then, if the power throughput is constant, the input current is constant and lighting flicker may be eliminated.

A simple pulsating load may be represented by the following expression:

$$q = Q_{av} + Q_{puls}\sin(\omega_{puls}t)$$

where q is the instantaneous torque, $Q_{av}$ is an offset torque, $Q_{puls}$ is the maximum torque per cycle, $\omega_{puls}$ is the motor shaft speed, and t is time. Therefore, to require a constant output power from inverter drive 14, the speed of motor shaft 17 must follow a reciprocal relation with the torque:

$$\omega = \frac{P}{q} = \frac{P}{Q_{av} + Q_{puls}\sin(\omega_{puls}t)}$$

where P is the instantaneous power output of inverter drive 14.

The required variables are generally not readily available as data in the system in order to generate this relation in an open-loop form. However, an inverter drive using a flux vector or similar algorithm, whether open-loop or closed-loop, may provide a relatively fast-responding estimate of the motor shaft torque, either directly or in the form of a torque-producing (active) current variable. Therefore, a closed-loop control structure can be created in which the motor shaft torque is estimated so as to modulate the instantaneous shaft speed and therefore provide a close approximation to the ideal constant power situation throughout a shaft revolution. Such an arrangement also inherently takes advantage of the mechanical inertia of the system, whereby reducing the speed also generates torque in the inertia which reduces the fluctuation seen at the motor shaft. A second, slower-acting control loop may maintain the overall average speed at the value required by the driven process, whilst allowing substantial speed variation within each shaft revolution. These control loops are described in more detail below.

Figure 2A:
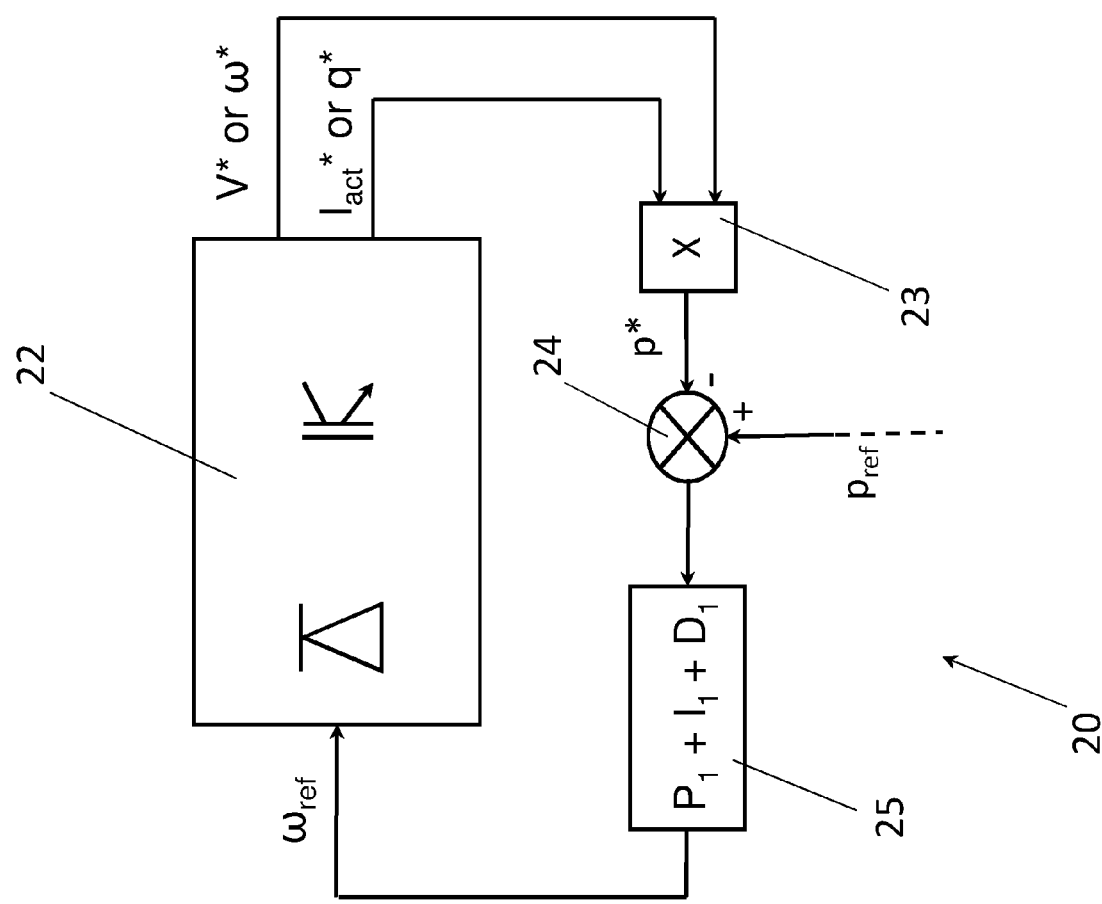
FIG. 2A is a schematic diagram of an electrical drive system for controlling a power output of an inverter drive, in accordance with an embodiment of the disclosure.

FIG. 2A shows in schematic form the structure of a power regulation controller 20, in accordance with an embodiment of the disclosure. Power regulation controller 20 may be used to attenuate lighting flicker, as explained above.

Power regulation controller 20 comprises inverter drive 22, multiplier block 23, subtraction block 24 and PID controller 25. It should be understood that multiplier block 23, subtraction block 24 and PID controller 25 may be embodied in software and/or hardware, and may form part of inverter drive 22. Although not shown, inverter drive 22 is arranged to deliver power to an electric motor for driving a pulsating load, as illustrated in FIG. 1.

FIG. 2B illustrates an average speed controller 26 in accordance with an embodiment of the present disclosure. Average speed controller 26 comprises subtraction block 27 and PI controller 28. Again, subtraction block 27 and PI controller 28 may be embodied in software and/or hardware and for example may form part of inverter drive 22. The output of PI controller 28 serves as an input to subtraction block 24.

Figure 3:
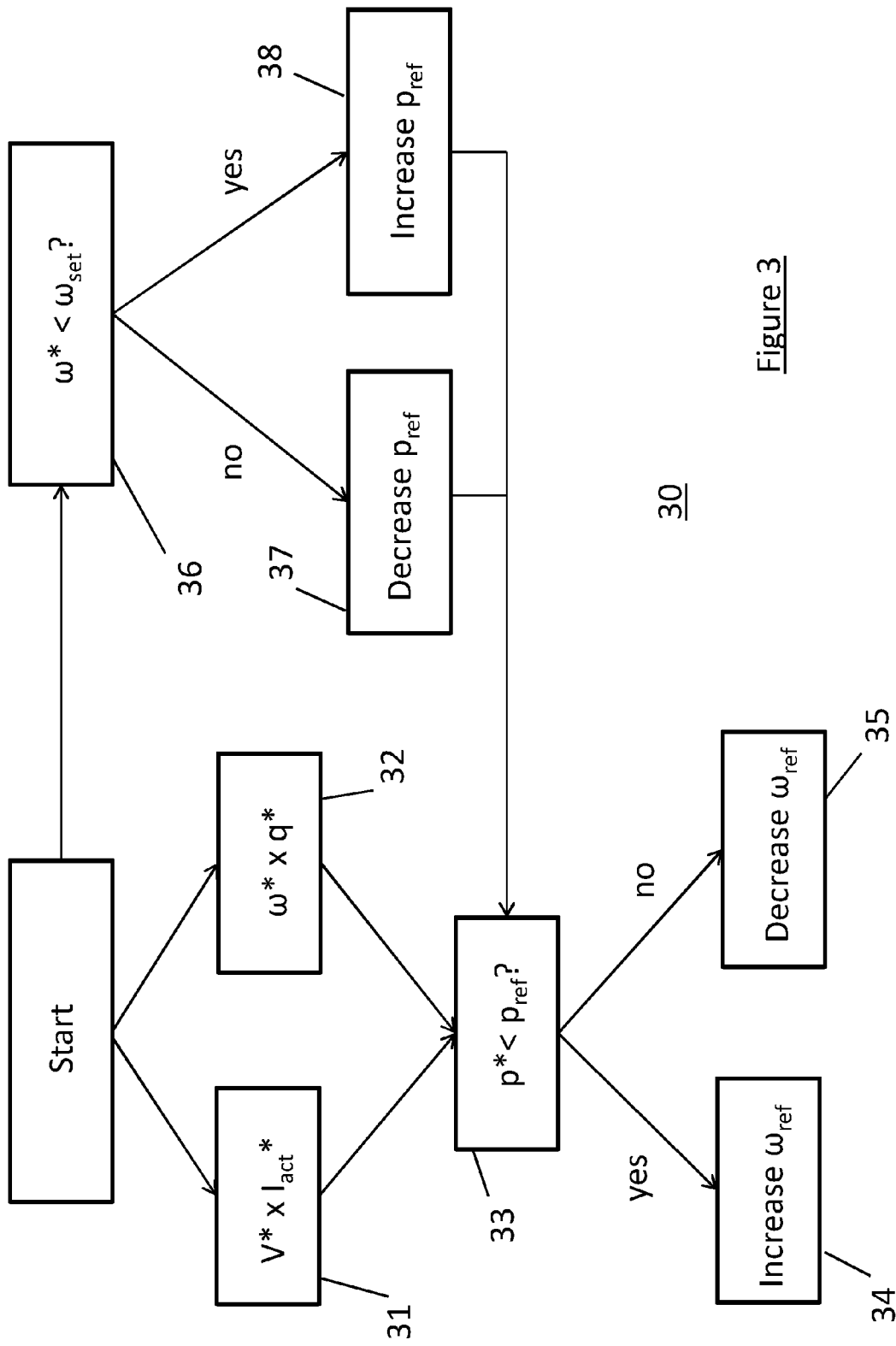
FIG. 3 is a flowchart showing a method of controlling a power output of an inverter drive, in accordance with an embodiment of the disclosure.

FIG. 3 illustrates steps that are taken by a method 30 according to an embodiment of the disclosure, with reference to FIGS. 2A and 2B.

The instantaneous power output p* delivered by inverter drive 22 is substantially continually estimated by multiplying in multiplier block 23 the output voltage and the active current estimates V* and $I_{act}$* of inverter drive 22 (step 31). Alternatively, instantaneous power output p* is estimated by multiplying in multiplier block 23 the instantaneous speed and instantaneous torque estimates ω* and q* of inverter drive 22 (step 32). The estimates are preferably obtained as fast-responding real-time data from inverter drive 22, as described above.

The estimated instantaneous power output p* is compared with the reference power $p_{ref}$ in subtraction block 24 to give a power error variable (step 33). The power error variable is processed by PID controller 25 to give the reference speed $\omega_{ref}$ for inverter drive 22. By setting suitable gains in PID controller 25, instantaneous power output p* may be regulated to a substantially constant value close to $p_{ref}$. If instantaneous power output p* is less than reference power $p_{ref}$, reference speed $\omega_{ref}$ is increased (step 34). If instantaneous power output p* is not less than reference power $p_{ref}$, reference speed $\omega_{ref}$ is decreased (step 35). Increasing or decreasing $\omega_{ref}$ causes the output speed or frequency of inverter drive 22 to be varied accordingly.

Reference instantaneous power $p_{ref}$ is set as follows. The average speed $\omega_{set}$, as required by the process in which inverter drive 22 is incorporated, is set by the operator. This may be the average, long-term speed of inverter drive 22 and is largely a function of the requirements of the load being driven. Average speed $\omega_{set}$ is compared with estimated instantaneous speed ω* in subtraction block 27 to give an instantaneous speed error (step 36). The instantaneous speed error is processed by PI controller 28 to give reference instantaneous power $p_{ref}$ for power regulator controller 20. If instantaneous speed ω* is not less than average speed $\omega_{set}$, reference power $p_{ref}$ is decreased (step 37). If instantaneous speed ω* is less than average speed $\omega_{set}$, reference power $p_{ref}$ is increased (step 38). The P and I terms are preferably chosen to be low values so that the value of $p_{ref}$ does not vary significantly during a shaft revolution, giving substantially constant power output within a revolution.

In FIGS. 2A and 2B, blocks 25 and 28 are shown as well-known PID controllers for clarity. It should be understood that other control system designs may be used, however, such as for example state-space control. The controllers can be implemented using any of various well-known devices such as analogue electronic circuits, programmable controllers, or as code in one or more microprocessors. For instance, the code may be programmed into inverter drive 22 in the case of a digital inverter drive.

Whilst the disclosure has been described in connection with a preferred embodiment, it is to be understood that the disclosure is not limited to these embodiments, and that alterations, modifications, and variations of these embodiments may be carried out by the skilled person without departing from the scope of the disclosure. For instance, whilst the disclosure has been described primarily in the context of reducing or eliminating lighting flicker, it may have wider applications for example whenever there is a need to stabilise, balance or otherwise control a power output an inverter drive.

In addition, whilst the above embodiment illustrates the case where an inverter drive is used to operate a pulsating load, the same method of power output regulation or control may be equally applicable in the case where the load is replaced by a power source providing a periodically oscillating power to the inverter drive, and wherein the inverter drive is used to feed the power into the mains supply. For example, whilst the specific embodiment relates to an inverter drive operating on a load, a similar but inverse arrangement may be used in which a generator run by a reciprocating mechanical element is used operate the inverter. Thus, the disclosure is more generally applicable to any case where an inverter is in operable connection with a component arranged to produce or generate a periodically varying force.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An electromechanical system comprising:
an inverter drive;
a component arranged during operation to generate a variable force having one or more periodic frequency components; and
processing circuitry arranged to:
determine the power output of the inverter drive;
measure a difference between the power output and a reference power output; and
control an output frequency of the inverter drive substantially over one period of the variable force as a function of the measured difference, so as to stabilise the power output during operation of the component.

2. A inverter drive comprising processing circuitry arranged to cause the inverter drive, when the inverter drive is operably connected via an electrical machine to a component arranged during operation to generate a variable force having one or more periodic frequency components, to:
determine the power output of the inverter drive;
measure a difference between the power output and a reference power output; and
control an output frequency of the inverter drive substantially over one period of the variable force as a function of the measured difference, so as to stabilise the power output during operation of the component.

3. A method of controlling a power output of an inverter drive operably connected via an electrical machine to a component arranged during operation to generate a variable force having one or more periodic frequency components, comprising:
determining the power output of the inverter drive;
determining a difference between the power output and a reference power output; and
controlling an output frequency of the inverter drive substantially over one period of the variable force as a function of the difference, so as to stabilise the power output during operation of the component.

4. The method of claim 3, wherein the electrical machine is an electric motor, and wherein the output power is delivered by the inverter drive to the component so as to cause the component to generate the variable force.

5. The method of claim 3, wherein the component is arranged during operation to generate a pulsating force.

6. The method of claim 3, wherein the variable force is a variable torque.

7. The method of claim 3, wherein the stabilised power output is substantially constant over one period of the variable force.

8. The method of claim 3, wherein an average output frequency of the inverter drive is substantially constant one period of the variable force.

9. The method of claim 3, wherein a frequency of the one or more periodic frequency components is between about 1.6 Hz and about 25 Hz.

10. The method of claim 3, wherein the reference power output is determined by:
   determining an output frequency of the inverter drive;
   determining a difference between the output frequency and a reference output frequency; and
   controlling the reference power output as a function of the difference between the output frequency and the reference output frequency.

11. The method of claim 3, wherein determining the power output of the inverter drive comprises determining an output voltage and an output current of the inverter drive.

12. The method of claim 3, wherein determining the power output of the inverter drive comprises determining an output frequency and an output torque of the electrical machine.

13. The method of claim 3, wherein stabilising the power output results in stabilising an input current of the inverter drive.

14. The method of claim 3, wherein the variable force generated by component during operation is expressed as $q=Q_{av}+Q_{cyc} \sin(\omega_{cyc} t)$, wherein: q is a magnitude of the force; $Q_{av}$, $Q_{cyc}$ and $\omega_{cyc}$ are constants; and t is time.

15. The method of claim 3, wherein an input current of the inverter drive is connected to a mains power supply.

16. A machine-readable medium having instructions stored thereon and configured, when read by a machine, to cause the steps of claim 3 to be carried out.

* * * * *